United States Patent [19]

Yamazaki et al.

[11] Patent Number: 4,935,937

[45] Date of Patent: Jun. 19, 1990

[54] ABNORMALITY DETECTION DEVICE FOR LASER OSCILLATOR PIPING SYSTEM

[75] Inventors: Etsuo Yamazaki, Hachioji; Nobuaki Iehisa, Yamanashi, both of Japan

[73] Assignee: Fanuc Ltd., Yamanashi, Japan

[21] Appl. No.: 295,950

[22] PCT Filed: Mar. 19, 1988

[86] PCT No.: PCT/JP88/00171

§ 371 Date: Nov. 18, 1988

§ 102(e) Date: Nov. 18, 1988

[87] PCT Pub. No.: WO88/07275

PCT Pub. Date: Sep. 22, 1988

[30] Foreign Application Priority Data

Mar. 19, 1987 [JP] Japan ................................ 62-62445

[51] Int. Cl.⁵ .......................... H01S 3/22; H01S 3/223
[52] U.S. Cl. ......................................... 372/58; 372/55; 372/59
[58] Field of Search .................. 372/55, 58, 59, 109

[56] References Cited

U.S. PATENT DOCUMENTS

| | | | |
|---|---|---|---|
| 4,283,686 | 8/1981 | Daugherty et al. | 372/58 |
| 4,718,071 | 1/1988 | Steffen | 372/58 |
| 4,794,613 | 12/1988 | Nilsen et al. | 372/58 |
| 4,803,693 | 2/1989 | Schramm | 372/58 |

FOREIGN PATENT DOCUMENTS

| | | | |
|---|---|---|---|
| 0054939 | 6/1982 | European Pat. Off. | 372/58 |
| 55-145068 | 10/1980 | Japan . | |
| 55-160483 | 12/1980 | Japan . | |
| 57-146356 | 9/1982 | Japan . | |
| 60-41276 | 3/1985 | Japan . | |
| 60-52081 | 3/1985 | Japan . | |
| 0085883 | 5/1986 | Japan | 372/58 |
| 62-282478 | 12/1987 | Japan . | |

Primary Examiner—William L. Sikes
Assistant Examiner—Georgia Y. Epps
Attorney, Agent, or Firm—Armstrong, Nikaido, Marmelstein, Kubovcik & Murray

[57] ABSTRACT

In a piping system for a laser oscillator (1), there are provided gas medium circulating pipes (211, 212, 213, 214) connected with a laser discharge tube (11) for circulating the gas medium therethrough, a gas medium circulating pump (23) arranged in the gas medium circulating pipes, a gas medium supply pipe (217, 218) for supplying a gas medium to the gas medium circulating pipes, a gas medium exhaust pump (24) arranged in a gas medium exhaust pipe and driven by a drive device for exhausting the gas medium in the laser discharge tube and the gas medium circulating pipes, and a control device (7) for controlling the operation of the laser oscillator piping system, the control device receiving a signal from the pressure sensor and generating a signal to be supplied to the gas medium exhaust pump and a signal to be supplied to a display device (6). After the switching valve (26) in the medium gas pipes is closed and the medium gas exhaust pump (24) is started to be driven, the existence or non-existence of an abnormality of the laser oscillator piping system is detected and displayed based on a determination of whether or not an operation signal of the pressure sensor (3) is generated within a predetermined length of time.

1 Claim, 2 Drawing Sheets

ABNORMALITY DETECTION DEVICE FOR LASER OSCILLATOR PIPING SYSTEM

TECHNICAL FIELD

The present invention relates to an abnormality detection device for a laser oscillator piping system used, for example, for precision processing and the like.

PRIOR ART

In general, when a laser discharge tube of a laser oscillator is actuated, the laser discharge tube is filled with a gas medium such as a mixture of carbon dioxide, nitrogen gas, and helium gas. In this case, used and deteriorated remaining gas medium must be withdrawn from the laser discharge tube as well as the piping system connected with the laser discharge tube, and subsequently, the laser discharge tube and the related piping system thereof must be filled with a new gas. However, but if an abnormality such as a penetration of outside air or leakage of inside gas exists in the piping system, an unnecessarily long time is required to withdraw the remaining gas medium, and further, it becomes difficult to determine when the withdrawal operation will end, resulting in a problem of an inconvenient practice.

To carry out the operation described above, a simple and reliable structure for a predetermined procedure for operating the structure should be prepared, but a satisfactorily appropriate prior art structure is not known. An object of the present invention is to provide an improved abnormality detection device for a laser oscillator piping system to cope with the aspect of the problem described above.

DISCLOSURE OF THE INVENTION

According to the present invention, there is provided an abnormality detection device for a laser oscillator piping system including a laser discharge tube for generating a laser oscillation in a gas medium filled therein, gas medium circulating pipes connected with the laser discharge tube for circulating the gas medium through the gas medium circulating pipes, a gas medium circulalting pump arranged in the gas medium circulating pipes, a gas medium supply pipe for supplying a gas medium to the gas medium circulating pipes, a switching valve arranged in the gas medium supply pipe, a pressure sensor connected with the gas medium supply pipe, a gas medium gas exhaust pipe driven by a drive device for discharging the gas medium in the laser discharge tube and the gas medium circulating pipes, and a control device for controlling the operation of the laser oscillator piping system, in which the control device receives a signal from the pressure sensor and generates a signal to be supplied to the gas medium exhaust pump and a signal to be supplied to a display device, characterized in that, after the switching valve in the gas medium pipes is closed and the drive of the gas medium exhaust pump is started to be driven, the existence or non-existence of an abnormality of the laser oscillator piping system is detected and displayed based on a determination of whether or not an operation signal of the pressure sensor is generated within a predetermined length of time.

DESCRIPTION OF THE PREFERRED EMBODIMENTS

Figure 1:
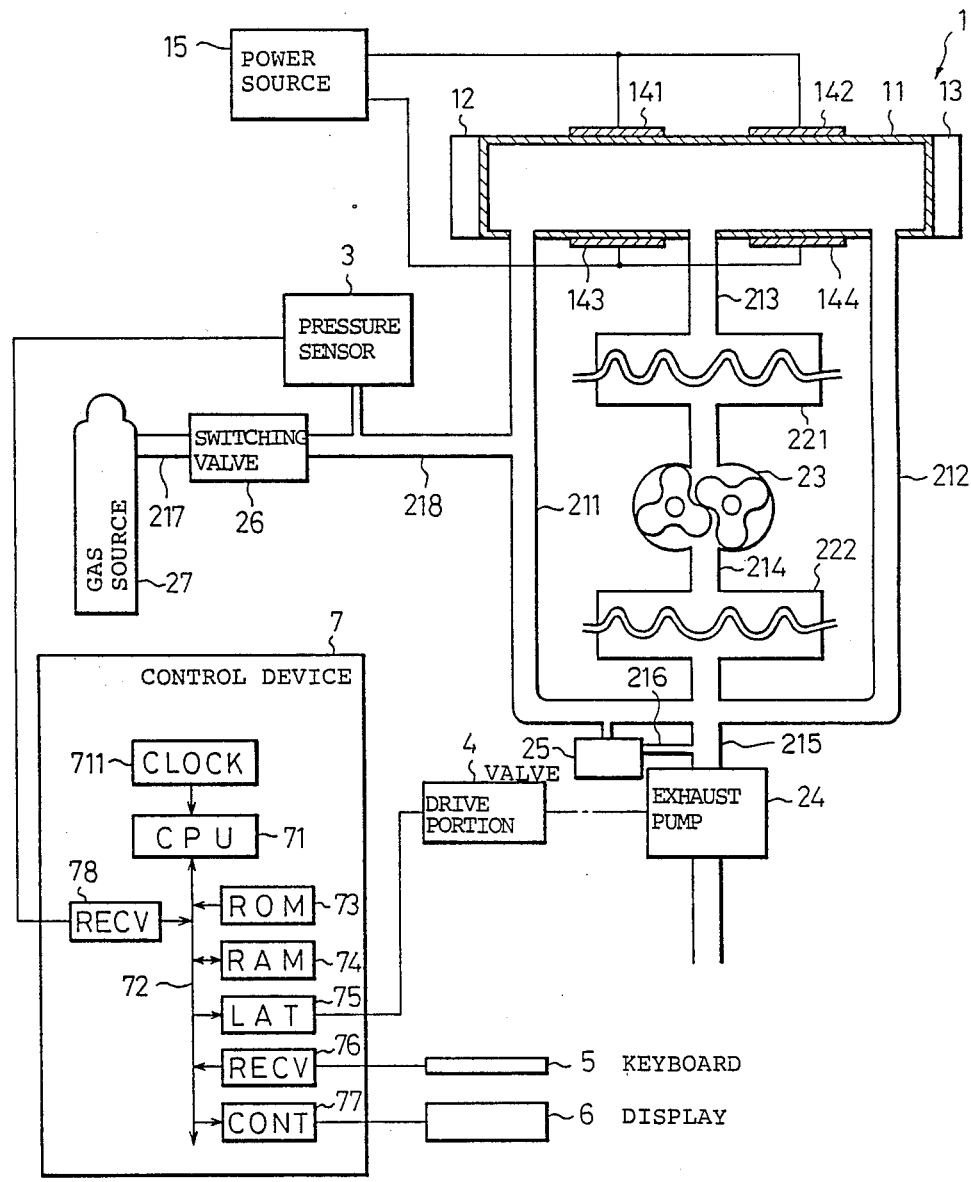
FIG. 1 shows an arrangement of an abnormality detection device for a laser oscillator piping system as an embodiment of the present invention.

An abnormality detection device for a laser oscillator piping system as an embodiment of the present invention is shown in FIG. 1.

In FIG. 1, the laser oscillator 1 includes a laser discharge tube 11, a total reflection mirror 12, an output coupling mirror 13, electrodes 141 and 142 on one side, and electrodes 143 and 144 on the other side. The electrodes 141 and 142 on one side are connected with one side of the output terminal of the power source 15, and the electrodes 143 and 144 on the other side are connected with the other side of the output terminal of the power source 15.

The gas piping connected with the laser discharge tube 11, includes the gas circulating pipes 211, 212, 213 and 214, the gas supply pipes 217 and 218, the gas exhaust pipe 215, and the gas circulation portion exhaust pipe 216. In the gas circulating pipes, a circulating pump 23, for example, a Roots type, and coolers 221 and 222 are arranged. By the operation of the gas circulating pump, the gas medium withdrawn from the laser discharge tube 11 through the pipe 213 flows through the cooler 221, the circulating pump 23, the pipe 214, and the cooler 222, then branches to the pipes 211 and 212, and returns to the laser discharge tube.

When a switching valve 26 is opened, a gas medium, for example, a mixture of carbon dioxide, nitrogen gas, and helium gas, stored in a gas source is supplied through pipes 217 and 218 to the laser discharge tube.

The gas medium in the laser discharge tube 11 and the gas circulating pipes 211, 212, 213, and 214 is exhausted through the pipe 215 by the operation of the gas exhaust pump 24. The exhaust pump 24 is driven by a drive device 4.

The gas supply pipe is equipped with a pressure sensor 3, and the gas circulating pipe 211 is equipped with a gas circulating portion exhaust pipe 216 including a needle valve type control valve 25.

To control the laser oscillator piping system, a control device is arranged. The control device includes a CPU 71, clock portion 711, bus 72, ROM 73, RAM 74, latch portion 75, keyboard signal receiving portion 76, display control portion 77, and pressure sensor signal receiving portion 78. The output signal of the latch portion 75 is delivered to the exhaust pump drive portion 4; the signal from the keyboard is delivered to the keyboard signal receiving portion; the signal from the display control portion 77 is delivered to the display portion 6 of cathode ray tube or the like; and the output signal of the pressure sensor 3 is delivered to the pressure sensor signal receiving portion 78.

In the device shown in FIG. 1, before the laser discharge tube 11 is actuated, the laser discharge tube 11 must be filled with a medium gas, for example, a mixture of carbon dioxide, nitrogen gas and helium gas. In this case, after the switching valve 26 in the gas supply pipe is closed, the gas exhaust pump 24 is driven, and accordingly, used and deteriorated gas medium remaining in the laser discharge tube 11 and piping system is removed from the device. In a process of a gradual failure of the pressure of the gas medium in the piping system, the value of the gas pressure corresponding to a predetermined length of time such as 15 sec. is monitored, and when the predetermined length of time has elapsed, if the value of gas pressure in the piping system is less than 2 Torr, for example, it is determined that an abnormality does not exist, and thus the operation of the gas exhaust pump is stopped and, subsequently, an operation under the normal procedure is carried out, but if the gas pressure does not drop to the predetermined value of pressure, it is determined that an abnormality such as a penetration of outside air or leakage of inside gas exists, and thus an alarm is indicated at the display portion 6.

Figure 2:
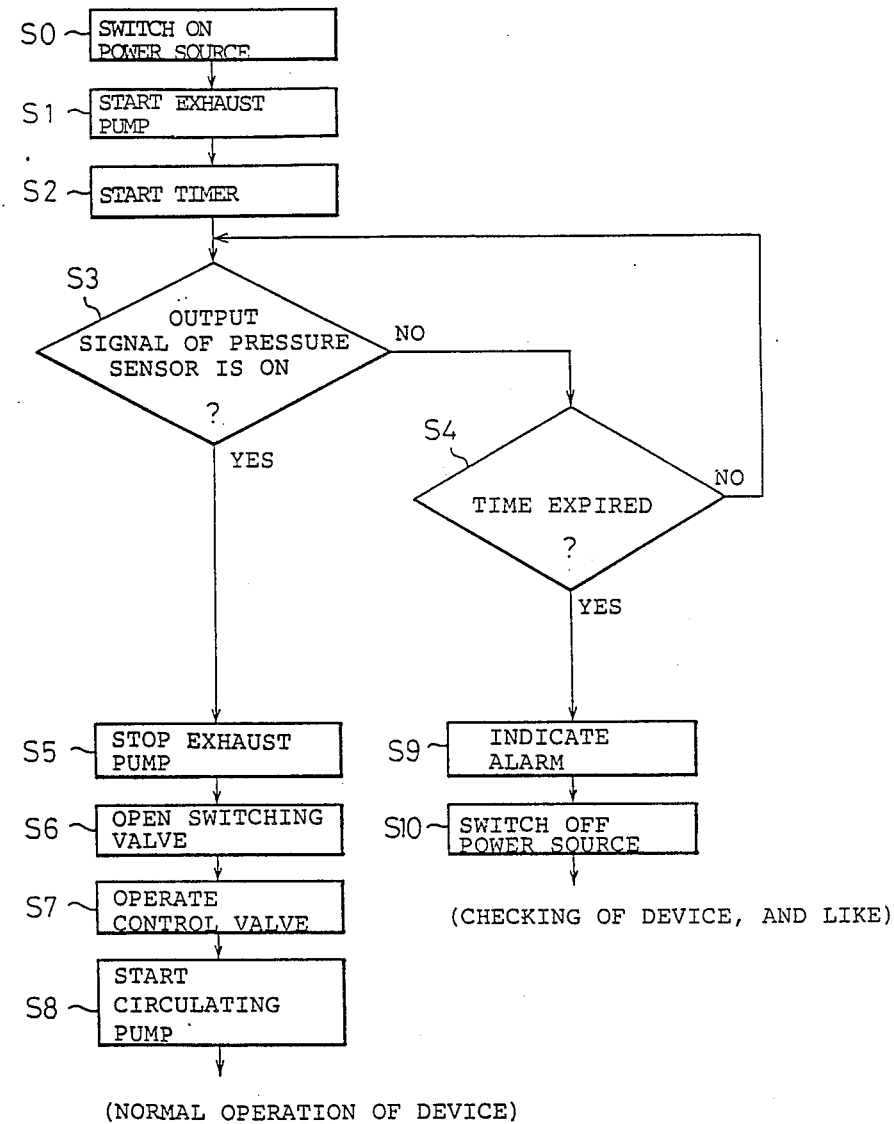
FIG. 2 is a flow chart showing an example of the operation of the device shown in FIG. 1.

The flow chart in FIG. 2 describes an example of an operation of an abnormality detection device for the laser oscillator piping system shown in FIG. 1.

In step S0, when a power source is turned on, an exhaust pump 24 is started in step S1, a timer function of the control device 7 is started in step S2, and a determination of whether or not an output signal of the pressure sensor is ON is carried out in step S3. If the result of the determination is YES, this indicates a non-existence of an abnormality in the laser oscillator piping system, and thus the exhaust pump 24 operation is stopped in step S5, a switch valve 26 is closed in step S6, a control valve 25 is operated in step 7, and a gas circulating pump 23 is started in step S8.

If the result of the determination is NO, a determination of whether or not a time has expired is carried out in step 4. If the result of the determination is NO, step 3 is repeated. If the result of the determination is YES, this indicates the existence of an abnormality such as a penetration of outside air or a leakage of inside gas, and thus an alarm is indicated at the display portion 6. Subsequently, a power source is turned off in step 10, and the operation proceeds to the next steps, i.e., checking of the device, etc.

Further, in the example mentioned above, the laser discharge tube is described as a single piece, but this is not limited to this case, and a plurality of the laser discharge tubes may be used in a parallel arrangement.

In the device of FIG. 1, after the switching valve in the gas medium supply pipes is closed and the gas medium exhaust pump is driven, the existence or non-existence of an abnormality of the laser oscillator piping system is detected and displayed based on a determination of whether or not an operation signal of the pressure sensor is generated within a predetermined length of time, and thus the detection and display of the existence or non-existence of an abnormality in the piping system can be appropriately carried out by a relatively simple construction.

We claim:

1. An abnormality detection device for a laser oscillator piping system comprising:
   a laser discharge tube for generating a laser oscillation in a gas medium filled therein;
   gas medium circulating pipes connected with said laser discharge tube for circulating the gas medium therethrough;
   a gas medium circulating pump arranged in the gas medium circulating pipes;
   a gas medium supply pipe for supplying a gas medium to said gas medium circulating pipes;
   a switching valve arranged in said gas medium supply pipe;
   a pressure sensor connected with said gas medium supply pipe;
   a gas medium exhaust pump arranged in a gas medium exhaust pipe and driven by a drive device for exhausting the gas medium in said laser discharge tube and said gas medium circulating pipes; and
   a control device for controlling the operation of said laser oscillator piping system, said control device receiving a signal from said pressure sensor and generating a signal to be supplied to said gas medium exhaust pump and a signal to be supplied to a display device;
   wherein, after the switching valve in the gas medium pipes is closed and the gas medium exhaust pump is started to be driven, an abnormality of said oscillator piping system is detected and displayed based on a determination of whether an operation signal of said pressure sensor is generated within a predetermined length of time.

* * * * *

UNITED STATES PATENT AND TRADEMARK OFFICE
CERTIFICATE OF CORRECTION

PATENT NO. : 4,935,937
DATED : June 19, 1990
INVENTOR(S) : YAMAZAKI et al

It is certified that error appears in the above-identified patent and that said Letters Patent is hereby corrected as shown below:

On the cover page, Item [22], "Mar. 19, 1988" should read --Feb. 19, 1988--.

Signed and Sealed this

Twenty-fourth Day of September, 1991

Attest:

HARRY F. MANBECK, JR.

Attesting Officer     Commissioner of Patents and Trademarks